US012098237B2

(12) United States Patent
Lindekens et al.

(10) Patent No.: US 12,098,237 B2
(45) Date of Patent: Sep. 24, 2024

(54) CURABLE RESIN COMPOSITION

(71) Applicant: ALLNEX BELGIUM S.A., Drogenbos (BE)

(72) Inventors: Luc Lindekens, Merchtem (BE); Patrice Roose, Sint-Pieters-Leeuw (BE)

(73) Assignee: ALLNEX BELGIUM S.A., Drogenbos (BE)

( * ) Notice: Subject to any disclaimer, the term of this patent is extended or adjusted under 35 U.S.C. 154(b) by 634 days.

(21) Appl. No.: 17/297,092

(22) PCT Filed: Jan. 9, 2020

(86) PCT No.: PCT/EP2020/050397
§ 371 (c)(1),
(2) Date: May 26, 2021

(87) PCT Pub. No.: WO2020/144260
PCT Pub. Date: Jul. 16, 2020

(65) Prior Publication Data
US 2022/0185943 A1 Jun. 16, 2022

(30) Foreign Application Priority Data
Jan. 11, 2019 (EP) ..................................... 19151466

(51) Int. Cl.
| | | |
|---|---|---|
| *C08G 18/67* | (2006.01) | |
| *C08F 220/14* | (2006.01) | |
| *C08F 220/18* | (2006.01) | |
| *C08F 220/20* | (2006.01) | |
| *C08G 18/12* | (2006.01) | |
| *C08G 18/48* | (2006.01) | |
| *C08G 18/73* | (2006.01) | |
| *C08G 18/75* | (2006.01) | |
| *C08G 18/76* | (2006.01) | |
| *C09D 4/06* | (2006.01) | |
| *C09D 7/20* | (2018.01) | |
| *C09D 175/16* | (2006.01) | |

(52) U.S. Cl.
CPC .......... *C08G 18/672* (2013.01); *C08F 220/14* (2013.01); *C08F 220/1811* (2020.02); *C08F 220/20* (2013.01); *C08G 18/12* (2013.01); *C08G 18/4825* (2013.01); *C08G 18/4854* (2013.01); *C08G 18/73* (2013.01); *C08G 18/755* (2013.01); *C08G 18/7621* (2013.01); *C09D 4/06* (2013.01); *C09D 7/20* (2018.01); *C09D 175/16* (2013.01); *C08G 2150/00* (2013.01)

(58) Field of Classification Search
None
See application file for complete search history.

(56) References Cited

U.S. PATENT DOCUMENTS

| | | | | |
|---|---|---|---|---|
| 6,853,788 | B2 * | 2/2005 | Oshio | C08G 18/4854 |
| | | | | 385/127 |
| 6,862,392 | B2 * | 3/2005 | Fabian | C08G 18/758 |
| | | | | 385/127 |
| 7,943,206 | B2 * | 5/2011 | Jones | G02B 1/04 |
| | | | | 522/74 |
| 11,840,639 | B2 * | 12/2023 | Moore | B05C 5/02 |
| 2020/0199352 | A1 * | 6/2020 | Masuda | C09J 155/005 |
| 2022/0185943 | A1 * | 6/2022 | Lindekens | C08G 18/12 |
| 2023/0242697 | A1 * | 8/2023 | Nishiura | C08F 226/06 |
| | | | | 522/96 |

FOREIGN PATENT DOCUMENTS

| | | | |
|---|---|---|---|
| EP | 0 329 441 | 8/1989 | |
| EP | 1 361 240 | 11/2003 | |
| EP | 2 009 038 | 12/2008 | |
| EP | 2 089 333 | 8/2009 | |
| NZ | 538821 A * | 7/2007 | ........... C03C 25/106 |
| WO | 2008/076299 | 6/2008 | |
| WO | 2008/120983 | 10/2008 | |

OTHER PUBLICATIONS

International Search Report (ISR) issued Mar. 26, 2020 in International (PCT) Application No. PCT/EP2020/050397.

\* cited by examiner

*Primary Examiner* — Sanza L. McClendon
(74) *Attorney, Agent, or Firm* — Wenderoth, Lind & Ponack, L.L.P.

(57) ABSTRACT

The present invention generally relates to the field of curable resin compositions for cold flexible applications which are prepared from at least one monofunctional monomer and at least one urethane (meth)acrylate and which exhibit high performing coating properties over a broad range of service temperatures including temperatures in very cold conditions, methods for making these curable compositions and their uses.

17 Claims, No Drawings

CURABLE RESIN COMPOSITION

TECHNICAL FIELD

The present invention mainly relates to the field of resins used in curable compositions which are prepared from at least one monofunctional monomer and at least one urethane (meth)acrylate and which exhibit high performing coating properties over a broad range of service temperatures including temperatures in very cold conditions, methods for making these curable compositions and their uses.

BACKGROUND ART

Polymer based materials are used in wide-spread applications for their high specific strength, easy processing and excellent protection abilities when applied to substrates. When it comes to overall resistance properties in terms of chemicals, mechanics and humidity, thermosets are preferred, as dense crosslinking introduces mechanical strength along with resistance to chemicals, water, stain and damage. Challenging is to avoid the concomitant brittleness that may appear when the polymer network lacks any channel of energy dissipation (damping) upon deformation when mechanically stressed. Usually, the glass transition of the cured network is tuned close to the service temperature in order to optimize damping. Well-designed materials can withstand brittle failure (fracture) over a limited temperature span below the glass transition temperature ($T_g$) in the so-called brittle-to-ductile transition zone of the glassy state where Young's modulus is high. However, the temperature range where Young's modulus ($E_Y$) is sufficiently high and brittle failure is avoided generally covers 20 to 30° C. in usual ambient conditions for uniform materials.

Toughness ($U_T$) is a property that describes properly a material characterized by a significant Young's modulus which sustains deformation to an enhanced extent (ductile) before failure. It corresponds to the maximum mechanical energy density that can be stored in the material before failure under specified loading conditions and is often determined by the total area under a stress-strain curve up to break.

A well-known example to improve toughness at a given service temperature is rubber toughness of thermoplastics where a low $T_g$ compound (for instance: rubber) is incorporated in a glassy environment following multiple strategies (blending, extrusion, reaction induced). Basically, the incorporation of soft domains as stress dissipation paths retards the occurrence of fatal failure and enhances toughness. Efficient over a limited temperature range, it remains a challenge to achieve a fair $E_Y/U_T$ balance over a wide range of fluctuating temperatures following this approach.

In particular, improved performance in the low temperature range is more and more required for some specific coating applications where the service temperature can vary over broad range according to ambient and atmospheric conditions, including cold freezing conditions. In most of these applications, liquid precursors with tunable flow properties are desired and the ultimate properties of the coating or material are achieved after a curing step often activated in ambient conditions with the help of accelerators or by a radiation source.

Coatings and layered materials in the construction, automotive, packaging or electronics area are typical examples where resilience toward large temperature variations is a primary prerequisite.

As a specific example, water-proofing membranes, applied as moisture and humidity resistant surface protections on roofs, concrete floors, parking, garage and warehouse surfaces, balconies etc . . . , are subjected to permanent variation of environmental and ambient conditions resulting in permanent material stress, typically between −30° C. and 30° C. depending on the geographical location.

Another growing application refers to outdoor coatings used for solar panel repair.

Other examples can be found in the automotive world where parts e.g. under the hood of a car, are required to demonstrate mechanical integrity, dimensional stability and chemical resistance over a temperature range as broad as 190° C., namely from −40° C. to 150° C. Also for coatings of printed circuit boards in the electronic industry (conformal coatings), requirements for thermal shock between −40° C. and 120° C. are often imposed.

EP0329441 describes a mixture of an urethane acrylate with a molecular weight (Mw) from 1000 to 6000 Dalton combined with an aliphatic mono acrylates, an aliphatic bicyclic mono (meth)acrylate and optionally multifunctional (meth)acrylates which can be used in conformal coatings.

However, there is still a need to develop a curable resin composition which results in a coating, film, layer, adhesive or part after free-radical polymerization which combines stiffness and failure resistance over a large temperature window extending deep below 0° C.

Technical Problem

The present invention aims to provide a resin for a thermal or radiation curable material or coating composition which results in a coating, film, layer, adhesive or part after free-radical polymerization which is resilient toward large temperature fluctuations in terms of mechanical failure. The resulting coating, film, layer, adhesive or part is characterized by a sizeable tensile modulus (Young's modulus $E_Y$) along with a suitable toughness ($U_T$) over a broad range of temperatures extending significantly in the subzero range.

General Description of the Invention

In order to overcome the above-mentioned technical problem, the present invention provides:

A curable resin composition (X) for cold flexible applications which is prepared from:
- A) at least one diluent (D) comprising at least 80 wt. % of at least one monofunctional monomer (M1) compared to the total weight of the at least one diluent (D), wherein the at least one monofunctional monomer (M1) results in a polymer which has a glass transition temperature ($T_g$) superior to 40° C.,
- B) at least one urethane (meth)acrylate (U) which is the reaction product of:
  1) at least one hydroxy functional (meth)acrylate (HA),
  2) at least one polyisocyanate (P) and
  3) at least one hydroxy functional polyether (PE) which has an average molar mass which is in the range from 2000 to 5000 g/mol and
- C) at least one radical initiator (I),
  wherein the at least one urethane (meth)acrylate (U) has an average molar mass which is in the range from 2000 to 6000 g/mol,
  wherein the ratio between the average molar mass of the at least one urethane (meth)acrylate (U) and the average molar mass of the at least one hydroxy functional polyether (PE) is ≤1.5, wherein the curable resin composition (X) after free-radical polymerization shows:

a Young's modulus at 23° C. ($E_Y^{23}$) of at least 50 MPa and a toughness at −20° C. ($U_T^{-20}$) of at least 0.5 J/cm³ and wherein the curable resin composition (X) comprises from 20 wt. % to 50 wt. % of the at least one urethane (meth)acrylate (U) compared to the total weight of the curable composition (X).

Cold flexible applications refers to applications for which the curable resin composition (X) after free-radical polymerization is submitted to a broad range of temperatures from −40° C. to +150° C., preferably from −30° C. to +30° C., more preferably from −20° C. to +23° C. and most preferably from −20° C. to +20° C. Although the curable resin composition (X) after free-radical polymerization is submitted to this broad range of temperatures, it is still showing a Young's modulus at 23° C. ($E_Y^{23}$) of at least 50 MPa and a toughness at −20° C. ($U_T^{-20}$) of at least 0.5 J/cm³. This means that the curable resin composition (X) after free-radical polymerization is resilient toward large temperature fluctuations in terms of mechanical failure. Cold flexible applications refers in particular to waterproofing coating applications, additive manufacturing (3D printing), fiber reinforced composites, adhesives applications, structural adhesives applications, electrical insulating applications, food packaging applications, food packaging adhesives applications, printed circuit boards coatings, conformal coating applications and repair coatings for solar panel.

Young's modulus or tensile modulus of elasticity ($E_Y$) is a mechanical property that provides an index for the degree of stiffness of a solid material. It defines the relationship between tensile stress (force per unit area) and tensile strain (relative deformation) of a material in the linear elasticity regime upon uniaxial deformation. In the context of the invention, Young's modulus is measured and reported at a temperature of 23° C. according to one of the following standard methods for the determination of tensile properties, ASTM D638 (Standard Test Method for Tensile Properties of Plastics), ASTM D882 (Standard Test Method for Tensile Properties of Thin Plastic Sheeting) or IS0527-1 (Plastics—Determination of tensile properties). According to one embodiment, the standard method for measuring the Young's modulus is IS0527-1 (Plastics—Determination of tensile properties). As Young's modulus increases with decreasing temperature, the value at 23° C. ($E_Y^{23}$) defines a suitable lower bound.

Toughness ($U_T$) is an index for the amount of mechanical energy per unit volume required to break a material. In the context of the invention toughness is determined at a temperature of −20° C. ($U_T^{-20}$) as the total area under the stress-strain curve up to failure measured according to the same standard methods used for the determination of Young's modulus, namely: ASTM D638 (Standard Test Method for Tensile Properties of Plastics), ASTM D882 (Standard Test Method for Tensile Properties of Thin Plastic Sheeting) or IS0527-1 (Plastics—Determination of tensile properties). According to one embodiment, the standard method for determining the toughness is IS0527-1 (Plastics—Determination of tensile properties). The toughness value at −20° C. ($U_T^{-20}$) defines a suitable lower bound as it usually increases at higher temperatures.

According to the invention, the curable resin composition (X) shows after free-radical polymerization a Young's modulus at 23° C. ($E_Y^{23}$) of at least 50 MPa and a toughness at −20° C. ($U_T^{-20}$) of at least 0.5 J/cm³. With these balanced mechanical properties, the resulting cured resin coating, film, layer, adhesive or part combines stiffness and failure resistance over a large temperature range extending deep below 0° C. which is necessary for applications like waterproofing, barrier coating, food packaging adhesives, electrical insulating, conformal coatings repair coatings for solar panel and the likes.

The property balance of the curable resin composition (X) after free radical polymerization is imparted by the combination of an urethane (meth)acrylate (U) having a hydroxy functional polyether (PE) backbone and a diluent (D) comprising at least 80 wt. % of monofunctional monomer (M1) compared to the total weight of the diluent (D), and which results in a polymer which has a glass transition temperature ($T_g$) superior to 40° C. The ratio between the average molar mass of the at least one urethane (meth)acrylate (U) and the average molar mass of the at least one hydroxy functional polyether (PE) being ≤1.5.

Indeed, the diluent (D) shows a significant difference of polarity with respect to the hydroxy functional polyether (PE) backbone of the urethane (meth)acrylate (U).

The polarity contrast and the difference in the average molar mass between the polyether (PE) backbone of the urethane (meth)acrylate (U) and the linear polymer segments of the monofunctional monomer (M1) build upon polymerization of the curable resin composition (X) induces a gradient of composition in the final material irrespective of the type of activation. The gradient of composition results from the phase separation of the urethane (meth)acrylate (U) and the diluent (D) comprising the monofunctional monomer (M1) after polymerization. This phase separation leads to a specific distribution of the urethane (meth)acrylate (U) and the diluent (D) in the cured resin composition (X). This thermodynamically driven process along with the free-radical polymerization reaction ultimately lead to highly elastic networks showing enhanced toughness at low temperatures demonstrated by delayed failure upon elongation. The curable resin composition (X) according to the invention may be used over a large range of temperatures. In particular, the curable resin composition (X) is suitable to be used at a range of temperatures from −40° C. to +150° C., preferably from −30° C. to +30° C., more preferably from −20° C. to +23° C. and most preferably from −20° C. to +20° C. Indeed, the curable resin composition (X) shows a suitable Young's modulus and toughness balance (or resistance to mechanical failure) over these ranges of temperatures.

In addition, the curable resin composition (X) can be cured at ambient temperature which simplifies the application process. Furthermore, the curable resin composition (X) avoids the use of free polyisocyanates typical for 2K polyurethane resin systems which are used in applications with a large range of temperature and relative humidity conditions. This is an advantage in view of the increasing concern about toxic materials (polyisocyanate).

Another aspect of the invention is a process for preparing the curable resin composition (X), comprising the steps of:

Admixing the at least one diluent (D) and the at least one urethane (meth)acrylate (U) and Adding by dissolution or mixing at least one radical initiator (I) for activation of the free-radical polymerization. The radical initiator (I) can be selected from thermal initiators, redox initiators or photoinitiators whether or not in combination with curing accelerators or other curing aids.

The present invention also refers to the use of the curable resin composition (X) for cold flexible applications which are preferably selected from the group consisting in waterproofing coating applications, additive manufacturing (3D printing), fiber reinforced composites, adhesives applications, structural adhesives applications, electrical insulating applications, food packaging applications, food packaging adhesives applications, printed circuit boards coatings and conformal coating applications. In particular, the curable resin composition (X) may be used for instance for waterproofing ambient-cured membranes for the protection of roofs, balconies, parking, garage and warehouse surfaces, UV adhesives used in automotive applications, conformal coatings used to protect printed circuit board and repair coatings for solar panel.

Another aspect of the invention is a coating, an adhesive, a layer, a film or a part prepared from curable resin composition (X).

Another aspect of the invention is a method for coating a substrate with a curable resin composition (X) which comprises the steps of:
Step 1: Applying the curable resin composition (X) to at least one surface of a substrate and
Step 2: Curing the curable resin composition (X) by submitting the coated substrate to radiation, ambient temperature and/or to heat.

DESCRIPTION OF PREFERRED EMBODIMENTS

The present invention proposes a curable resin composition (X) for cold flexible applications which is prepared from:
A) at least one diluent (D) comprising at least 80 wt. % of at least one monofunctional monomer (M1) compared to the total weight of the at least one diluent (D), wherein the at least one monofunctional monomer (M1) results in a polymer which has a glass transition temperature ($T_g$) superior to 40° C.,
B) at least one urethane (meth)acrylate (U) which is the reaction product of:
  1) at least one hydroxy functional (meth)acrylate (HA),
  2) at least one polyisocyanate (P) and
  3) at least one hydroxy functional polyether (PE) which has an average molar mass which is in the range from 2000 to 5000 g/mol and
C) at least one radical initiator (I),
wherein the at least one urethane (meth)acrylate (U) has an average molar mass which is in the range from 2000 to 6000 g/mol,
wherein the ratio between the average molar mass of the at least one urethane (meth)acrylate (U) and the average molar mass of the at least one hydroxy functional polyether (PE) is ≤1.5,
wherein the curable resin composition (X) after free-radical polymerization shows:
a Young's modulus at 23° C. ($E_Y^{23}$) of at least 50 MPa and
a toughness at −20° C. ($U_T^{-20}$) of at least 0.5 J/cm$^3$ and
wherein the curable resin composition (X) comprises from 20 wt. % to 50 wt. % of the at least one urethane (meth)acrylate (U) compared to the total weight of the curable composition (X).

The term "curable resin composition" stands for a composition which can be submitted to free-radical polymerization (or be cured) after thermal activation by heating or at ambient (or room) temperature whether or not using accelerators or by exposure to radiation (e.g. UV light, electron beam). Preferably the curable resin composition (X) is a thermally curable composition or evaporative curable composition.

The term "free-radical polymerization" refers to a chain polymerization in which the active centers are radicals. Radical polymerization involves the formation of free radicals via decomposition of an initiator by light (photolysis), temperature (thermolysis), or redox reaction and their reaction leads to the formation of polymers or polymer networks.

The glass transition temperature ($T_g$) marks the boundary between the glassy, rigid state and the softer relaxed state of a polymer or polymer network which can be rubbery or even fluid. A suitable method for the determination of the glass transition temperature of solid polymers or polymer networks is dynamical mechanical thermal analysis as for instance described by the standard method ASTM D4065-01 (Standard test method for the assignment of the glass transition temperature by Dynamic Mechanical Analysis).

The term "diluent" refers to a solvent or other liquid composition used to dilute, or to make thinner or less viscous or less concentrated by admixing to another composition.

According to one embodiment, the curable resin composition (X) after being submitted to free-radical polymerization (or after being cured) may show a Young's modulus at 23° C. ($E_Y^{23}$) of at least 50 MPa (megapascal), preferably at least 100 MPa, more preferably at least 200 MPa, most preferably at least 500 MPa and even most preferably at least 700 MPa. The higher the Young's modulus ($E_Y^{23}$) at 23° C., the harder and stiffer the resulting cured coating or material is.

Preferably, the curable resin composition (X) after being submitted to free-radical polymerization (or after being cured) shows, a toughness at −20° C. ($U_T^{-20}$) of at least 0.5 J/cm$^3$, more preferably a toughness of at least 0.7 J/cm$^3$ and most preferably a toughness of at least 1 J/cm$^3$. The higher the toughness, the more resilient the cured resin is toward mechanical failure.

The curable resin composition (X) comprises an amount of urethane (meth)acrylate (U) from 20 wt. % to 50 wt. % compared to the total weight of the curable resin composition (X). Preferably, the amount of the urethane (meth)acrylate (U) is from 20 wt. % to 40 wt. %, and more preferably is from 20 wt. % to 35 wt. % and most preferably from 25 wt. % to 35 wt. % compared to the total weight of the curable resin composition (X).

As to the amount of the diluent (D), the curable resin composition (X) may comprise from 50 wt. % to 80 wt. % compared to the total weight of the curable resin composition (X). Preferably, the curable resin composition (X) may comprise from 60 wt. % to 80 wt. %, more preferably from 65 wt. % to 80 wt. % and most preferably from 65 wt % to 75 wt. % of the diluent (D) compared to the total weight of the curable resin composition (X).

According to one embodiment, the curable resin composition (X) comprises from 25 wt. % to 40 wt. % of the at least one urethane (meth)acrylate (U) and from 60 wt. % to 75 wt. % of the at least one diluent (D) compared to the total weight of the curable resin composition (X).

According to one embodiment, the curable resin composition (X) consists essentially of the diluent (D), the urethane (meth)acrylate (U) and the radical initiator (I). In this case, the sum of the wt. % of the diluent (D), the wt. % of the urethane (meth)acrylate and the wt. % of the radical initiator (I) is 100%.

According to the invention, the curable resin composition (X) comprises at least one diluent (D) comprising at least 80 wt. % of at least one monofunctional monomer (M1) compared to the total weight of the at least one diluent (D), wherein the at least one monofunctional monomer (M1) results in a polymer which has a glass transition temperature ($T_g$) superior to 40° C. Preferably, the glass transition temperature ($T_g$) of the polymer obtained from the at least one monofunctional monomer (M1) may be superior to 50° C., more preferably superior to 60° C. and most preferably which is superior to 70° C.

According to one embodiment of the invention, the diluent (D) may comprise at least 85 wt. %, preferably at least 90 wt. %, more preferably at least 95 wt. % and most preferably at least 99 wt. % of at least one monofunctional monomer (M1) compared to the total weight of the diluent (D) and wherein the at least one monofunctional monomer (M1) results in a polymer which has a glass transition temperature ($T_g$) superior to 40° C. The diluent (D) may also comprise 100 wt. % of at least one monofunctional monomer (M1) compared to the total weight of the diluent (D).

Suitable monofunctional monomers (M1) can be selected from the group consisting of methacrylic acid, methyl methacrylate (MMA), ethylmethacrylate, n-butylmethacrylate (BuMA), tert-butyl methacrylate (tBuMA), cyclohexyl methacrylate (CHMA), glycidyl methacrylate, isobornyl methacrylate (IBOMA), (hydroxyethyl)methacrylate (HEMA), hydroxypropylmethacrylate (HPMA), acrylic acid, methyl acrylate (MA), ethyl acrylate (EA), n-butyl acrylate (BuA), tert-butyl acrylate (tBuA), 2-ethyl hexyl acrylate (2EHA), isooctyl acrylate (IOA), isobornyl acrylate (IBOA), isobornyl methacrylate (IBoMA), hydroxyethylacrylate (HEA), cyclic trimethylol formal acrylate (CTFA), vinylacetate (VoAc), benzyl methacrylate (BMA) and any mixtures thereof.

More preferably the monofunctional monomers (M1) can be selected from the group consisting of methyl methacrylate (MMA), n-butyl methacrylate (BuMA), tert-butyl methacrylate (tBuMA), cyclohexyl methacrylate (CHMA), hydroxyethyl-methacrylate (HEMA), hydroxypropyl methacrylate (HPMA), isobornyl acrylate (IBOA), isobornyl methacrylate (IBoMA), benzyl methacrylate (BMA) and any mixtures thereof.

The diluent (D) may also comprise in addition to the monofunctional monomer (M1), at least one difunctional monomer (M2) and/or at least one trifunctional monomer (M3).

Examples of difunctional monomers (M2) and trifunctional monomers (M3) are di and tri(meth)acrylated monomers such as 1,6-hexanediol di(meth)acrylate (HDD(M)A), di or tri propylene glycol di(meth)acrylate (DPGD(M)A, TPGD(M)A), trimethylolpropanetri(meth)acrylate (TMPT(M)A) and the ethoxylated and/or propoxylated derivatives thereof, pentaerythritoltri(meth)acrylate (PETI(M)A) and the ethoxylated and/or propoxylated derivatives thereof, glyceroltri(meth)acrylate and the ethoxylated and/or propoxylated derivatives thereof, dianhydrohexitols di(meth)acrylates (like isosorbide di(meth)acrylate) and the ethoxylated and/or propoxylated derivatives thereof, bisphenol A di(meth)acrylate and the ethoxylated and/or propoxylated derivatives thereof.

When the diluent (D) comprises at least one difunctional monomer (M2) and/or at least one trifunctional monomer (M3), the amount of the monofunctional monomers (M1) is preferably at least 95 wt. % whereas the amount of the difunctional monomer (M2) and/or at least one trifunctional monomer (M3) is preferably less than 5 wt. %.

According to one embodiment, the diluent (D) consists essentially of at least one monofunctional monomer (M1) or mixtures of monofunctional monomers (M1) and does not comprise any multifunctional monomer.

The urethane (meth)acrylate (U) is the reaction product from:
1) at least one hydroxy functional (meth)acrylate (HA),
2) at least one polyisocyanate (P) and
3) at least one hydroxy functional polyether (PE) which has an average molar mass which is in the range from 2000 to 5000 g/mol.

The urethane (meth)acrylate (U) is preferably prepared from hydroxy functional (meth)acrylates (HA) as end groups.

The urethane (meth)acrylate (U) is preferably prepared according to the following reactants molar ratio: [PE]/[P]/[HA]=1/2/2.

According to one embodiment the urethane (meth)acrylate (U) may be of formula (1):

(1) Hydroxy functional (meth)acrylate (HA)-polyisocyanate (P)-hydroxy functional polyether (PE)-polyisocyanate (P)-hydroxy functional (meth)acrylate (HA).

Hydroxy functional (meth)acrylates (HA) can be mono-hydroxy compounds comprising at least two (meth)acryl functions such as glycerol di(meth)acrylate, trimethylolpropane di(meth)acrylate, glycerol di(meth)acrylate, pentaerythritol tri(meth)acrylate, ditrimethylolpropane tri(meth)acrylate, dipentaerythritol penta(meth)acrylate and their (poly)ethoxylated and/or (poly)propoxylated equivalents. More preferred poly(meth)acryloyl mono-hydroxy compounds are glycerol di(meth)acrylate, trimethylolpropane di(meth)acrylate. Most preferred are the acrylate derivatives.

Suitable mono-hydroxy functional (meth)acrylates (HA) are preferably selected from the group of mono(meth)acrylates consisting of: hydroxyethyl acrylate (HEA), hydroxypropyl acrylate (HPA), hydroxyethyl methacrylate (HEMA), hydroxybutyl acrylate (HBA), hydroxybutyl methacrylate (HBMA), cardura acrylate, the ethoxylated, propoxylated and/or lactone derivatives thereof and any mixtures thereof.

Preferred hydroxy functional (meth)acrylate (HA) are selected from the group consisting of hydroxyethyl acrylate (HEA), hydroxyethyl methacrylate (HEMA) and any mixtures thereof.

By a "polyisocyanate" (P) is meant to designate organic compounds that comprise at least two and typically up to six isocyanate groups. The polyisocyanate compound usually comprises not more than six isocyanate groups and preferably not more than 3 isocyanate groups. The polyisocyanate (P) is most preferably a di-isocyanate (DI). The polyisocyanate (P) is generally selected from aliphatic, cycloaliphatic, aromatic and/or heterocyclic polyisocyanates or combinations thereof. Possibly the polyisocyanate (P) contains allophanate groups, biuret and/or isocyanurate groups.

Examples of aromatic polyisocyanates that may be used are 1,4-diisocyanatobenzene (BDI), 2,4-diisocyanatotoluene (toluene diisocyanate (TDI)), 1,1'-methylenebis[4-isocyanatobenzene] (MDI), xylilene diisocyanate (XDI), 1,5-naphtalene diisocyanate (NDI), toluidine diisocyanate (TODI), tetramethylxylylene diisocyanate (TMXDI) and p-phenylene diisocyanate (PPDI). Other examples of polyisocyanates that may be used in the context of the invention are trimethyl 1,6 hexamethylene diisocyanate, 4,4'-diisocyanatodicyclohexylmethane, 4,4'-diisocyanatodiphenylmethane, the technical mixtures with 2,4-diisocyanatodiphenylmethane and also the higher homologues of above mentioned diisocyanates, 2,4-diisocyanatotoluene and technical mixtures of them with 2,6-diisocyanatotoluene, as well as the copolymerization product of 3-isopropenyl-a,a'-dimethylbenzyl isocyanate (TMI). Examples of aliphatic and cycloaliphatic polyisocyanates are 1,6-diisocyanatohexane (HDI), 1,1'-methylene bis[4-isocyanatocyclohexane] (H12MDI), 5-isocyanato-1-isocyanatomethyl-1,3,3-trimethyl-cyclohexane (isophorone diisocyanate, IPDI). Polyisocyanates containing more than two isocyanate groups are for example the derivatives of above mentioned diisocyanates like 1,6-diisocyanatohexane biuret and isocyanurate.

According to one embodiment, the polyisocyanate (P) is selected from the group consisting of 1,6-diisocyanatohexane (hexamethylene diisocyanate, HDI), 1,1'-methylene bis[4-isocyanatocyclohexane] (H12MDI), 5-isocyanato-1-isocyanatomethyl-1,3,3-trimethyl-cyclohexane (isophorone diisocyanate, IPDI), 1,4-diisocyanatobenzene (BDI), 2,4-diisocyanatotoluene (toluene diisocyanate (TDI)), 1,1'-methylenebis[4-isocyanatobenzene] (MDI), xylilene diisocyanate (XDI), 1,5-naphtalene diisocyanate (NDI), toluidine diisocyanate (TODI), tetramethylxylylene diisocyanate (TMXDI) and p-phenylene diisocyanate (PPDI), trimethyl 1,6 hexamethylene diisocyanate, 4,4'-diisocyanatodicyclohexylmethane, 4,4'-diisocyanatodiphenylmethane, 2,4-diisocyanatodiphenylmethane and any mixtures thereof.

Preferred in the context of the invention are aliphatic and/or cycloaliphatic polyisocyanates, more preferably diisocyanates. Particularly preferred are 1,6-diisocyanatohexane (HDI) and/or isophorone diisocyanate (IPDI).

The backbone of urethane (meth)acrylate (U) is at least one hydroxy functional polyether (PE) which has an average molar mass which is comprised from 2000 and 5000 g/mol, preferably from 2500 to 4700 g/mol and more preferably from 3000 to 4500 g/mol.

Suitable hydroxy functional polyether (PE) can be selected from the group consisting of polypropylene glycol, polybutylene glycol, polytetramethylene glycol and any mixtures thereof.

The urethane (meth)acrylate (U) has an average molar mass which is comprised from 2000 to 6000 g/mol, preferably from 3000 to 5300 g/mol, more preferably from 3200 to 5200 g/mol and most preferably from 3500 to 5100 g/mol. According to one specific embodiment, the urethane (meth)acrylate (U) has an average molar mass which is ≤5500 g/mol, preferably ≤5200 g/mol, and more preferably ≤ 5100 g/mol. In addition, the molar mass ratio between the average molar mass of the at least one urethane (meth)acrylate (U) and the average molar mass of the at least one hydroxy functional polyether (PE) is ≤1,5. According to one specific embodiment, the molar mass ratio between the average molar mass of the at least one urethane (meth)acrylate (U) and the average molar mass of the at least one hydroxy functional polyether (PE) is preferably ≤1.4 and more preferably is ≤1,3. According to another embodiment, the molar mass ratio between the average molar mass of the at least one urethane (meth)acrylate (U) and the average molar mass of the at least one hydroxy functional polyether (PE) can be ≤1.2.

The average molar mass of the urethane (meth)acrylate (U) and the average molar mass of the hydroxy functional polyether (PE) are determined as follows:

The average molar mass of the hydroxy functional polyether (PE) ($M_{PE}$) is estimated from the hydroxyl value (OHV in mg KOH/g, ASTM E222).). For instance, for a difunctional polyether $M_{PE}$=1000×56.1×2/OHV. The average molar mass of urethane(meth)acrylate (U) ($M_U$) is theoretically estimated from the stoichiometric ratio between the at least one hydroxy functional polyether (PE), the at least one polyisocyanate (P) and the at least one hydroxy functional (meth)acrylate (HA) as well as the respective molar masses of the constituents.

The molar mass of the urethane (meth)acrylate (U) ($M_U$) is calculated as follows: $M_U$=1×$M_{PE}$+2×$M_P$+2×$M_{HA}$.

The concentration of urethane linkages refers to (mol/kg) is calculated as (mol/kg) the number of moles urethane links (NHCOO) per kg of the total composition (incl. diluents, PI etc).

According to one embodiment, the urethane (meth)acrylate (U) shows a urethane linkage from 0.1 mol·kg$^{-1}$ to 1.0 mol·kg$^{-1}$, preferably from 0.3 to 0.8 mol·kg$^{-1}$, more preferably from 0.4 to 0.6 mol·kg$^{-1}$ and most preferably about 0.5 mol·kg$^{-1}$.

According to one embodiment, the curable resin composition (X) only comprises at least one urethane (meth) acrylate (U) as urethane (meth)acrylate and no further urethane (meth)acrylate.

According to one embodiment, the curable resin composition (X) only comprises one single urethane (meth)acrylate (U) and no other urethane (meth)acrylate.

According to the invention, the curable resin composition (X) comprises at least one radical initiator (I).

Preferably, the curable resin composition (X) comprises an amount of the at least one radical initiator (I) from 0.05 wt. % to 10 wt. %, more preferably from 0.2 wt. % to 4 wt. % and most preferably from 0.5 wt. % to 2.5 wt. % compared to the total weight of the curable resin composition (X).

The radical initiator (I) can be selected from thermal initiators, redox initiators or photoinitiators whether or not in combination with curing accelerators or other curing aids.

According to one embodiment of the invention, the radical initiator (I) may be a thermal initiator which is an azo compound such as, for example, azo isobutyronitrile (AIBN), 1,1'-azobis(cyclohexanenitrile), 1,1'-azobis(2,4,4-trimethylpentane), C-C labile compounds, such as benzopinacole, peroxides, and mixtures thereof.

According to another embodiment, the radical initiator (I) may be a thermal initiator which comprises peroxide. Peroxide includes organic and inorganic peroxides. In an embodiment, the thermal initiator is soluble in the composition. Examples of peroxides include for example, percarbonates (of the formula —OC(O)O—), peroxyesters (of the formula —C(O)OO—), diacylperoxides, also known as peranhydride (of the formula —C(O)OOC(O)—), dialkylperoxides or perethers (of the formula —OO—), hydroperoxides (of the formula —OOH), etc. The peroxides may also be oligomeric or polymeric in nature.

Examples of peroxides include for example, percarbonates (of the formula —OC(O)O—), peroxyesters (of the formula —C(O)OO—), diacylperoxides, also known as peranhydride (of the formula —C(O)OOC(O)—), dialkylperoxides or perethers (of the formula —OO—), hydroperoxides (of the formula —OOH), etc. The peroxides may also be oligomeric or polymeric in nature.

The thermal initiator may for example comprise a percarbonate, a perester or a peranhydride. Peranhydrides are for example benzoylperoxide (BPO) and lauroyl peroxide (commercially available as Laurox™). Peresters are for instance t-butyl per benzoate and 2-ethylhexyl perlaurate. Percarbonates are for example di-t-butylpercarbonate and di-2-ethylhexylpercarbonate or monopercarbonates.

In an embodiment, the thermal initiator is an organic peroxide. Examples of organic peroxides are: tertiary alkyl hydroperoxides (such as, for instance, t-butyl hydroperoxide), other hydroperoxides (such as, for instance, cumene hydroperoxide), a ketone peroxide (perketones, being an addition product of hydrogen peroxide and a ketone, such as, for instance, methyl ethyl ketone peroxide, methyl isobutylketone peroxide and acetylacetone peroxide), peroxyesters or peracids (such as, for instance, t-butyl peresters, benzoyl peroxide, peracetates and perbenzoates, lauroyl peroxide, including (di)peroxyesters, perethers (such as, for instance, peroxy diethyl ether).

In an embodiment, the thermal initiator comprises a peranhydride, for example benzoyl peroxide or lauroyl peroxide, peroxydicarbonate, for example di(4-t-butylcyclohexyl)-peroxydicarbonate, dicetyl peroxydicarbonate, or dimyristylperoxydicarbonate.

Preferably, the radical initiator (I) is selected from the group consisting of: Benzoylperoxides, 1,1-bis(t-butylperoxy) cyclohexane, o,o-tertiary-butyl-o-isopropyl monoperoxycarbonate, 2,5-dimethyl-2,5-di(-2ethylhexanoylperoxy) hexane,1,1-di(t-butylperoxy)-3,3,5-trimethylcyclohexane 2,2-di(t-butylperoxy)butane, 1-cyano-1(t-butylazo) cyclohexane and any combinations thereof.

Suitable accelerators can be for instance amine accelerators (alkyl anilines). Alkyl anilines react with peroxides to form amine radical cations and peroxide radicals and this reaction occurs at lower temperatures than the thermal decomposition of the peroxide.

Some examples of alkyl anilines used for this purpose are: N,N-dimethylaniline (DMA), N,N-diethylaniline (DEA), N,N-dimethyl-para-toluidine (DMpT), N,N-diisopropyl-para-toluidine (DiPpT), N,N-dihydroxyethyl-para-toluidine (DHEpT), ethoxylated dihydroxyethyl-para-toluidine.

Suitable radical photoinitiators are selected from the group consisting of: benzoylphosphine oxides, aryl ketones, benzophenones, hydroxylated ketones, I-hydroxyphenyl ketones, ketals, metallocenes, and any combination thereof.

According to one embodiment, the radical initiators (I) is a radical photoinitiator which is selected from the group consisting of: 2,4,6-trimethylbenzoyl diphenylphosphineoxide and 2,4,6-trimethylbenzoyl phenyl, ethoxy phosphine oxide, bis(2,4,6-trimethylbenzoyl)-phenylphosphineoxide, 2-methyl-1-[4-(methylthio)phenyl]-2-morpholinopropanone-1,2-benzyl-2-(dimethylamino)-1-[4-(4-morpholinyl) phenyl]-1-butanone, 2-dimethylamino-2-(4-methylbenzyl)-1-(4-morpholin-4-yl-phenyl)-butan-1-one, 4-benzoyl-4'-methyl diphenyl sulphide, 4,4'-bis(diethylamino) benzophenone, and 4,4'-bis(N,N'-dimethylamino) benzophenone (Michler's ketone), benzophenone, 4-methyl benzophenone, 2,4,6-trimethyl benzophenone, dimethoxybenzophenone, 1-hydroxycyclohexyl phenyl ketone, phenyl (1-hydroxyisopropyl)ketone, 2-hydroxy-1-[4-(2-hydroxyethoxy) phenyl]-2-methyl-1-propanone, 4-isopropylphenyl (1-hydroxyisopropyl)ketone, oligo-[2-hydroxy-2-methyl-1-[4-(1-methylvinyl)phenyl] propanone], camphorquinone, 4,4'-bis(diethylamino) benzophenone, benzil dimethyl ketal, bis(eta 5-2-4-cyclopentadien-1-yl) bis[2,6-difluoro-3-(1H-pyrrol-1-yl) phenyl] titanium, and any combination thereof.

Further radical photoinitiators include: benzoylphosphine oxides, such as, for example, 2,4,6-trimethylbenzoyl diphenylphosphine oxide (Lucirin TPO from BASF) and 2,4,6-trimethylbenzoyl phenyl, ethoxy phosphine oxide (Lucirin TPO-L from BASF), bis(2,4,6-trimethylbenzoyl)-phenylphosphineoxide (Irgacure 819 or BAPO from Ciba), 2-methyl-1-[4-(methylthio)phenyl]-2-morpholinopropanone-1 (Irgacure 907 from Ciba), 2-benzyl-2-(dimethylamino)-1-[4-(4-morpholinyl) phenyl]-1-butanone (Irgacure 369 from Ciba), 2-dimethylamino-2-(4-methyl-benzyl)-1-(4-morpholin-4-yl-phenyl)-butan-1-one (Irgacure 379 from Ciba), 4-benzoyl-4'-methyl diphenyl sulphide (Chivacure BMS from Chitec),4,4'-bis(diethylamino) benzophenone (Chivacure EMK from Chitec), 4,4'-bis(N,N'-dimethylamino) benzophenone (Michler's ketone), camphorquinone, 4,4'-bis(diethylamino) benzophenone (Chivacure EMK from Chitec), 4,4'-bis(N,N'-dimethylamino) benzophenone (Michler's ketone), bis(2,4,6-trimethylbenzoyl)-phenylphosphineoxide (Irgacure 819 or BAPO from Ciba), and metallocenes such as bis (eta 5-2-4-cyclopentadien-1-yl) bis [2,6-difluoro-3-(1H-pyrrol-1-yl) phenyl] titanium (Irgacure 784 from Ciba), or a mixture thereof.

According to one specific embodiment, the radical initiator (I) is selected from the group consisting of benzoylperoxide (BPO) and 1-hydroxycyclohexyl phenyl ketone (HCPK) and any mixtures thereof.

The compositions of the invention may also optionally comprise inert or functional resins, pigments, colorants, fillers and/or other additives suitable to improve the application of the formulated composition on a substrate and including not limitedly wetting agents, antioxidants, flow modification agents, slip agents, fire retardant agents, UV-protection agents, adhesion promoters, rheology modifiers, leveling agents, wetting agents, slip additives, stabilizers, anti-foam agents, alkoxysilanes, water and mixtures thereof.

The present invention also refers to a process for preparing the curable resin composition (X), comprising the steps of:

Admixing the at least one diluent (D) and the at least one urethane (meth)acrylate (U) and Adding by dissolution or mixing the at least one radical initiator (I) for activation of the free-radical polymerization. The radical initiator (I) can be selected from thermal initiators, redox initiators or photoinitiators whether or not in combination with curing accelerators or other curing aids.

The present invention also relates to the use of a curable resin composition (X) for cold flexible applications which are preferably selected from the group consisting in water-proofing coating applications, additive manufacturing (3D printing), fiber reinforced composites, adhesives applications, structural adhesives applications, electrical insulating applications, food packaging applications, food packaging adhesives applications, printed circuit boards coatings, conformal coating applications, and repair coatings for solar panel.

Another aspect of the invention is a coating, an adhesive, a film or any layer or part prepared from curable resin composition (X).

The present invention also refers to a method for coating a substrate with a curable resin composition (X) which comprises the steps of:

Step 1: Applying the curable resin composition (X) to at least one surface of a substrate and Step 2: Curing the curable coating composition by submitting the coated substrate to radiation, ambient temperature and/or to heat.

All the embodiments previously mentioned may be individually implemented or may be combined within reason.

The invention is now further described in more details in the following examples, which in no way intend to limit the invention or its applications.

Experimental Data

List of Materials:
- BHT=Butylated hydroxyl toluene
- DBTL=Dibutyl tin dilaurate
- PPG=Polypropylene glycol (Dow)
- PTMG=Polytetramethylene glycol (Mitsubishi)
- IPDI=Isophorone di isocyanate
- HDI=Hexamethylene di isocyanate
- TDI=Toluene di isocyanate
- HEA=Hydroxyethylacrylate
- HEMA=Hydroxyethylmethacrylate
- MMA=Methyl methacrylate
- IBoA=Isobornylacrylate
- BPO-FT=Dibenzoyl peroxide 50 wt. % active (United Initiators)
- DiPpT=N,N diisopropyl para-toluidine (Lanxess)
- HCPK=1-Hydroxycyclohexyl phenyl ketone (BASF)

The urethane (meth)acrylates (U) are prepared according to the same protocol which is described in detail for the synthesis of 1 PPG4K-UA-1 and using the reactants and the amounts of reactants mentioned in Table 1. A 5 liter double jacketed reactor vessel connected to an oil bath and equipped with a stirrer is charged with 1 mole equivalent of PPG4000 (2000 g) and 2 mole equivalent of IPDI (197.9 g). Next, 0.1 wt. % BHT relative to the diol content is added. Upon mixing the reactants, the reactor is heated to 60° C. followed by the addition of 0.05 wt. % of DBTL (based on the PPG4000 content). The heat released upon reaction leads to an increase of the temperature to approximately 70° C. The reaction is interrupted when the isocyanate content reaches 0.45 mmol/g (ISO 14896-determination of isocyanate content), typically after one hour. Next the temperature is adjusted to 70° C. and 2 mole equivalent of HEA (103.4 g) are charged. The reaction proceeds until a residual isocyanate content of 0.02 mmol/g is achieved.

TABLE 1

Composition of the urethane (meth)acrylates (U) used in the examples

| U | PE | OHV (mg KOH/g) | $M_{PE}$ (g/mol) | P | HA | PE/P/HA | $M_U$ (g/mol) | $M_U/M_{PE}$ |
|---|---|---|---|---|---|---|---|---|
| 1PPG4K-UMA-1 | PPG4000 | 25 | 4488 | IPDI | HEMA | 1/2/2 | 5192 | 1.16 |
| 1PTG3K-UMA-1 | PTMG3000 | 38 | 2953 | IPDI | HEMA | 1/2/2 | 3657 | 1.24 |
| 1PPG2K-UA-2 | PPG2000 | 56 | 2004 | IPDI | HEA | 1/2/2 | 2572 | 1.28 |
| 1PPG4K-UA-3 | PPG4000 | 25 | 4488 | TDI | HEA | 1/2/2 | 5068 | 1.13 |
| 1PPG4K-UMA-2 | PPG4000 | 25 | 4488 | HDI | HEMA | 1/2/2 | 5084 | 1.13 |
| 1PPG4K-UA-2 | PPG4000 | 25 | 4488 | HDI | HEA | 1/2/2 | 5056 | 1.13 |
| 1PPG4K-UA-1 | PPG4000 | 25 | 4488 | IPDI | HEA | 1/2/2 | 5164 | 1.15 |
| 1PTG3K-UA-1 | PTMG3000 | 38 | 2953 | IPDI | HEA | 1/2/2 | 3629 | 1.23 |
| 1PTG3K-UA-2 | PTMG3000 | 38 | 2953 | HDI | HEA | 1/2/2 | 3521 | 1.19 |
| 2PPG2K-UA-1* | PPG2000 | 56 | 2004 | IPDI | HEA | 2/3/2 | 4905 | 2.45 |
| 1PPG1K-UA-1* | PPG1000 | 112 | 1002 | IPDI | HEA | 1/2/2 | 1678 | 1.67 |

*= Comparative examples

Example 1: Ambient-Cured Resin Compositions in a Mass Ratio Urethane (Meth)Acrylate (U): Diluent (D)=25:75

1.1 Synthesis of the Urethane (Meth)Acrylate (U)

According to an embodiment of the invention, the urethane (meth)acrylate (U) is prepared from the hydroxy functional polyether (PE), the polyisocyanate (P) and the hydroxy functional (meth)acrylate (HA) in order to achieve a molar mass ratio≤1.5 and preferably ≤1.3 between the urethane (meth)acrylate (U) and the hydroxy functional polyether (PE). A description of the composition and the molar mass of all the urethane (meth)acrylates (U) used in the examples is provided in Table 1. The string code for the identification of the urethane (meth)acrylate (U) in Table 1 is: [#PEunits]+[type of PE with approximate molar mass]+[acrylate (UA) or methacrylate (UMA)]+[digit referring to the used di isocyanate (1=IPDI; 2=HDI; 3=TDI)]. The molar mass of the hydroxy functional polyether (PE) ($M_{PE}$) is estimated from the hydroxyl value (OHV, ASTM E222). The molar mass of the urethane (meth)acrylate U ($M_U$) is theoretically estimated from the stoichiometric ratio between the hydroxy functional polyether (PE), the polyisocyanate (P) and the hydroxy functional (meth)acrylate (HA) as well as the respective molar masses of the constituents. For example, the string code of 1PPG4K-UA-1 (line 7 in Table 1) refers to 1 mole of PPG4000 reacted with 2 moles of IPDI and 2 moles of HEA. The molar mass of PPG4000 is estimated from the hydroxyl value (25 mg KOH/g) as $M_{PE}$=1000×56.1×2/25=4488 g/mol and the molar mass of the urethane (meth)acrylate (U) is $M_U$=1×$M_{PE}$+2×$M_{IPDI}$+2×$M_{HEA}$=5164 g/mol. The ratio $M_U/M_{PE}$ is also reported in Table 1.

1.2 Formulation of the Curable Resin Composition

According to an embodiment of the invention, it is required to add a reactive diluent (D) and a radical initiator (I) to the urethane (meth)acrylate (U). The preparation of an ambient cure formulation with 25 wt % 1 PPG4K-UA-1 and 75 wt % MMA ($T_{g,PMMA}$=105° C.) with 2.5 wt % BPO and 2.3 wt % DiPpT (used in Table 2) is detailed as follows. For Mix-1, 5 g of 1PPG4K-UA-1 is diluted with 11 g of MMA. 1 g of BPO-FT (50 wt % active) is then dissolved in Mix-1 upon mixing. For Mix-2, 0.46 g of the accelerator DiPpT is dissolved in 2.54 g of MMA. Mix-1 and Mix-2 are blended together just before application.

1.3 Preparation of a Free-Standing Layer of Cured Resin

The measurement of the tensile properties requires a free-standing film or a layer of the cured resin. Free-standing layers of the ambient-cured resin compositions, according to the embodiments, are prepared as follows. A rectangular area of 6 cm by 10.5 cm is delimited by applying a double-side tape of 2 mm thickness onto a polypropylene film fixed on a clean glass plate. Mix-1 and Mix-2 as described previously are blended and 15 g of the resulting formulation is used to fill the rectangular casting area which is immediately covered with another polypropylene film and a glass plate to avoid evaporation of the diluent. The exothermic reaction of this 2K system starts quickly. After at least 24 h, the cured layer is removed as an isolated free-standing layer with a thickness of about 2 mm.

1.4 Tensile Properties at −20 and 23° C.

Tensile properties were measured with a Zwick Z010 universal testing machine at a cross-head speed of 50 mm/min. Experiments were conducted at room temperature (23° C.) in ambient conditions and at −20° C. in a temperature-controlled convection chamber with combined electrical heating and nitrogen cooling. For the tests, dumbbell-shaped samples were cut from the free-standing layers. The distance between the clamps was 30 mm and the inner width of the dumbbell was 3 mm. The thickness in the middle of the sample was measured using a Heidenhain MT25B digital length gauge. At least 3 samples were tested per cured layer. Tensile stress and strain were expressed as engineering values (relative to the initial section) in the curves. Following the guidelines of ASTM D638 (Standard Test Method for Tensile Properties of Plastics), ASTM D882 (Standard Test Method for Tensile Properties of Thin Plastic Sheeting) or IS0527-1 (Plastics—Determination of tensile properties), Young's modulus ($E_Y$) was estimated from the slope of the initial linear part of the tensile curve. Toughness ($U_T$) was estimated from the area under the curve. The data of Table 2 refer to the set of difunctional urethane (meth)acrylates (U) of Table 1 diluted in diluent (D) which is MMA in a mass ratio 25:75. According to a preferred embodiment of the invention, a ratio $M_U/M_{PE} \leq 1.5$ and more preferably $\leq 1.3$ is required to develop an enhanced toughness at −20° C. ($U_T \geq 0.5$ J/cm$^3$) with a minimum Young's modulus of 50 MPa at 23° C. Examples 2-1 to 2-9 in Table 2 illustrate this aspect with 25 wt. % of urethane (meth)acrylate (U) in the cured resin. The amount of diluent (D) after polymerization drives the $T_g$ to values much higher than 50° C. which results in a high Young's modulus at 23° C. The challenge is to achieve sufficient toughness at −20° C. for a system with a limited amount of urethane (meth)acrylate (U). Table 1 demonstrates the invention. The two comparative examples 2-10 and 2-11 show that when the mass ratio $M_U/M_{PE} > 1.5$ the excellent property balance is lost, in particular at −20° C. where the cured resins are brittle.

TABLE 2

| | | Diluent (D) = MMA (75 wt. %), radical initiator (I) = BPO (2.5 wt. %), Accelerator = DPpT (2.3 wt. %) | | | | | |
|---|---|---|---|---|---|---|---|
| No | U (25 wt. %) | $M_{PE}$ (g/mol) | $M_U/M_{PE}$ | $E_Y^{23}$ (MPa) | $U_T^{23}$ (J/cm$^3$) | $E_Y^{-20}$ (MPa) | $U_T^{-20}$ (J/cm$^3$) |
| 2-1 | 1PPG4K-UMA-1 | 4488 | 1.16 | 1280 | 6.1 | 2780 | 0.8 |
| 2-2 | 1PTG3K-UMA-1 | 2953 | 1.24 | 903 | 17.0 | 1560 | 0.8 |
| 2-3 | 1PPG2K-UA-2 | 2004 | 1.28 | 1210 | 6.6 | 2530 | 1.0 |
| 2-4 | 1PPG4K-UA-3 | 4488 | 1.13 | 1420 | 8.6 | 2120 | 1.0 |
| 2-5 | 1PPG4K-UMA-2 | 4488 | 1.13 | 1100 | 15.7 | 2700 | 1.0 |
| 2-6 | 1PPG4K-UA-2 | 4488 | 1.13 | 899 | 17.6 | 1990 | 1.2 |
| 2-7 | 1PPG4K-UA-1 | 4488 | 1.15 | 1160 | 8.2 | 2250 | 1.4 |
| 2-8 | 1PTG3K-UA-1 | 2953 | 1.23 | 790 | 12.0 | 1870 | 2.0 |
| 2-9 | 1PTG3K-UA-2 | 2953 | 1.19 | 872 | 14.6 | 1170 | 6.8 |
| 2-10 | 2PPG2K-UA-1* | 2004 | 2.45 | 1250 | 0.4 | 2640 | 0.3 |
| 2-11 | 1PPG1K-UA-1* | 1002 | 1.67 | 2060 | 2.7 | — | — |

*= Comparative examples

As to comparative example 2-11, no value has been measured for $E_Y^{-20}$ and $U_T^{-20}$, because the resulting cured resin was too brittle at −20° C.

Example 2: Ambient-Cured Resin Compositions in a Mass Ratio the Urethane (Meth)Acrylate (U): Diluent (D)=50:50

In this example the mass ratio between the urethane (meth)acrylate and the diluent is 50:50 instead of 25:75 as in example 1. Everything stays equal for the description except in the formulation step where for Mix-1, 10 g of the urethane (meth)acrylate (U) is diluted with 6 g of diluent (D) which is MMA. 1 g of BPO-FT (50 wt % active) is then dissolved in Mix-1 upon mixing. For Mix-2, 0.46 g of the accelerator DiPpT is dissolved in 2.54 g of MMA. Mix-1 and Mix-2 are blended together just before application.

2.1 Tensile Properties at −20 and 23° C. (Cf. Example 1)

The results of the lines 3-1 to 3-8 in Table 3 illustrate the invention where the formulation is rich in urethane (meth) acrylate (U). In contrast to example 1, with the high amount of urethane (meth)acrylate (U), the toughness at −20° C. is enhanced significantly but the challenge is to maintain a significant Young's modulus at 23° C. Results 3-1 to 3-9 demonstrate the importance of the mass ratio $M_U/M_{PE} \leq 1.5$ with respect to the unique tensile property balance at −20° C. and 23° C., according to the invention. Result 3-10 is based on a ratio $M_U/M_{PE} > 1.5$ for U and produces a cured resin with insufficient Young's modulus.

TABLE 3

| | | | | | | | |
|---|---|---|---|---|---|---|---|
| | | Diluent (D) = MMA (50 wt. %), radical initiator (I) = BPO (2.5 wt. %), Accelerator = DPpT (2.3 wt. %) | | | | | |
| No | U (50 wt. %) | $M_{PE}$ (g/mol) | $M_U/M_{PE}$ | $E_Y^{23}$ (MPa) | $U_T^{23}$ (J/cm³) | $E_Y^{-20}$ (MPa) | $U_T^{-20}$ (J/cm³) |
| 3-1 | 1PPG4K-UMA-1 | 4488 | 1.16 | 50 | 18.5 | 678 | 30.5 |
| 3-2 | 1PTG3K-UMA-1 | 2953 | 1.24 | 217 | 35.8 | 904 | 62.6 |
| 3-3 | 1PPG2K-UA-2 | 2004 | 1.28 | 60 | 14.2 | 813 | 5.66 |
| 3-4 | 1PPG4K-UA-3 | 4488 | 1.13 | 69 | 24.3 | 884 | 7.72 |
| 3-5 | 1PPG4K-UMA-2 | 4488 | 1.13 | 89 | 21.8 | 1080 | 12.6 |
| 3-6 | 1PPG4K-UA-2 | 4488 | 1.13 | 56 | 17.6 | 645 | 35.7 |
| 3-7 | 1PPG4K-UA-1 | 4488 | 1.15 | 66 | 19.7 | 1100 | 17 |
| 3-8 | 1PTG3K-UA-1 | 2953 | 1.23 | 102 | 28.6 | 610 | 42.9 |
| 3-10 | 2PPG2K-UA-1* | 2004 | 2.45 | 38 | 17.0 | 730 | 7.53 |

*= Comparative example

Example 3: Ultraviolet (UV)-Cured Resin Compositions at a Mass Ratio Urethane (Meth)Acrylate (U): Diluent (D)=30:70

According to a preferred embodiment, the invention is illustrated in this example for a curable resin compositions cured by photopolymerization. In addition, the invention is also highlighted for other reactive diluents. The urethane (meth)acrylate (U) 1 PPG4K-UA-2 is selected from example 1 (where the synthesis is described) for the preparation of the UV-curable formulations.

3.1 Formulation of the UV Curable Resin Composition

A UV-curable formulation with 30 wt % urethane (meth) acrylate (U) which is 1 PPG4K-UA-2 and 70 wt. % of diluent (D) is prepared as follows: 9 g of 1 PPG4K-UA-2 is diluted with 21 g of diluent (D). In this formulation, 90 mg of HCPK is then dissolved upon mixing.

3.2 Preparation of a Free-Standing Layer of Cured Resin

The measurement of the tensile properties requires a free-standing film or layer of the cured resin. Free-standing layers of the UV-cured resin compositions are prepared as follows. A rectangular piece of silicone sheet (1.5 mm) is pressed onto a glass plate for optimal wetting and holding power. Next, a rectangular spacer in silicone (same size as bottom layer) is pushed in contact with the silicone sheet in order to create a rectangular casting area. Finally, the assembly is closed with a glass panel of 3 mm using securing clamps. The resin is filled through a small opening in the silicone spacer while keeping the assembly in the upright position. The glass laminate is then photopolymerized in upwards position at a distance from a UV-A lamp (Panacol UV450) corresponding to a UV-A intensity of 3 mW cm⁻² (at 365 nm). Irradiation is maintained for 20 min and the cured resin is separated as a free-standing layer.

3.3 Tensile Properties at −20 and 23° C. (Cf. Example 1)

The results 4-1 to 4-3 in Table 4 show that the invention also applies when the free-radical polymerization is induced by light and when other diluents are used based on high $T_g$ mono(meth)acrylates such as IBoA and HEMA. Whilst Young's modulus is much higher than 50 MPa at 23° C., as expected at the mass ratio 30:70, sufficient toughness is achieved at −20° C. The result at line 4.4 is an example showing that when the mass ratio $M_U/M_{PE}$>1.5 the photo-cured resin is brittle at −20° C. with a low toughness value. The same formulation with a ratio $M_U/M_{PE}$≤1.5 for the urethane (meth)acrylate (U) leads to an improved toughness at −20° C. and still a high modulus at 23° C.

TABLE 4

| | | | | | | | |
|---|---|---|---|---|---|---|---|
| | | Photoinitiator = HCPK (0.3 wt. %) | | | | | |
| No | U (30 wt. %) | D (70 wt. %) | $M_U/M_{PE}$ | $E_Y^{23}$ (MPa) | $U_T^{23}$ (J/cm³) | $E_Y^{-20}$ (MPa) | $U_T^{-20}$ (J/cm³) |
| 4-1 | 1PPG4K-UA-2 | MMA | 1.13 | 457 | 23.2 | 1080 | 11.7 |
| 4-2 | 1PPG4K-UA-2 | IBoA | 1.13 | 416 | 25.5 | 848 | 2.9 |
| 4-3 | 1PPG4K-UA-2 | HEMA | 1.13 | 431 | 21.8 | 927 | 2.2 |
| 4-4 | 1PPG1K-UA-1* | HEMA | 1.67 | 1110 | 11.1 | 2470 | 0.1 |

*Comparative example

Example 4: Additive Manufacturing by UV-Stereolithography (SLA 3D Printing) of a Resin Composition at a Mass Ratio Urethane (Meth)Acrylate (U):Diluent (D)=40:60

In this example, the application of the invention in the field of additive manufacturing (3D printing) is illustrated for a curable resin composition cured by photopolymerization. The urethane (meth)acrylate (U) 1PPG4K-UMA-1 is selected from example 1 (where the synthesis is described) for the preparation of the UV-curable formulations.

4.1 Formulation of the UV Curable Resin Composition

A UV-curable formulation with 40 wt % urethane (meth) acrylate (U) which is 1PPG4K-UMA-1 and 60 wt. % of diluent (D) which is IBoA is prepared as follows: 120 g of 1PPG4K-UMA-1 is diluted with 180 g of MMA. In this formulation, 1.5 g of trimethylbenzoyl diphenylphosphine oxide (TPO) is next dissolved upon mixing.

4.2 Preparation of a Free-Standing Samples of the Cured Resin

The measurement of the tensile properties requires stand-alone parts of the cured resin. Dumbbell and rectangular shaped parts were printed using a Formlabs SLA station (Form 2) following exposure conditions predefined by the equipment supplier. The parts showed an well-defined dimensional balance without visual asymmetry (bend, torsion) and excellent definition. A post-cure treatment of the parts was included using a UV oven (Uvacube 100, Hönle) equipped with a 100 W mercury lamp. The samples were left for 30 min in the oven in order to complete the polymerization.

4.3 Tensile Properties at −20 and 23° C. (Cf. Example 1)

The result 5-1 in Table 5 shows that the invention also applies to parts prepared by additive manufacturing based on photo-induced free-radical polymerization. Whilst Young's modulus is higher than 50 MPa at 23° C., as expected at the mass ratio 40:60, a remarkable high level of toughness is achieved at −20° C.

TABLE 5

| | | Photoinitiator = TPO (0.5 wt. %) | | | | |
|---|---|---|---|---|---|---|
| No | U (40 wt. %) | D (60 wt. %) | $M_U/M_{PE}$ | $E_Y^{23}$ (MPa) | $U_T^{23}$ (J/cm$^3$) | $E_Y^{-20}$ (MPa) | $U_T^{-20}$ (J/cm$^3$) |
| 5-1 | 1PPG4K-UMA-1 | IBoA | 1.16 | 102 | 17.8 | 690 | 40.1 |

The invention claimed is:

1. A curable resin composition (X) for cold flexible applications which is prepared from:
   A) at least one diluent (D) comprising at least 80 wt. % of at least one monofunctional monomer (M1) compared to the total weight of the at least one diluent (D), wherein the at least one monofunctional monomer (M1) results in a polymer which has a glass transition temperature (Tg) superior to 40° C.,
   B) at least one urethane (meth)acrylate (U) which is the reaction product of:
      1) At least one hydroxy functional (meth)acrylate (HA),
      2) at least one polyisocyanate (P) and
      3) At least one hydroxy functional polyether (PE) which has an average molar mass which is in the range from 2000 to 5000 g/mol and
   C) at least one radical initiator (I),
   wherein the at least one urethane (meth)acrylate (U) has an average molar mass which is in the range from 2000 to 6000 g/mol,
   wherein the molar mass ratio between the average molar mass of the at least one urethane (meth)acrylate (U) and the average molar mass of the at least one hydroxy functional polyether (PE) is ≤1.5,
   wherein the curable resin composition (X) after free-radical polymerization shows:
      a Young's modulus at 23° C. ($E_Y$) of at least 50 MPa and toughness at −20° C. ($U_T$) of at least 0.5 J/cm$^3$ and
   wherein the curable resin composition (X) comprises from 20 wt. % to 50 wt. % of the at least one urethane (meth)acrylate (U) and from 50 wt. % to 80 wt. % of the at least one diluent (D), compared to the total weight of the curable resin composition (X).

2. The curable resin composition (X) according to claim 1 wherein the at least one radical initiator (I) is selected from the group consisting in thermal initiators, redox initiators or photoinitiators whether or not in combination with curing accelerators or other curing aids.

3. The curable resin composition (X) according to claim 1 wherein the curable resin composition (X) comprises an amount of the at least one radical initiator (I) from 0.05 wt. % to 10 wt. %.

4. The curable resin composition (X) according to claim 1 wherein the curable resin composition (X) after being submitted to free-radical polymerization shows a Young's modulus at 23° C. ($E_Y$ of at least 500 MPa.

5. The curable resin composition (X) according to claim 1 wherein the curable resin composition (X) after being submitted to free-radical polymerization shows a toughness at −20° C. ($U_T$) of at least 0.7 J/cm$^3$.

6. The curable resin composition (X) according to claim 1 wherein the at least one urethane (meth)acrylate (U) is of formula (1):

(1) Hydroxy functional (meth)acrylate (HA)-polyisocyanate (P)-hydroxy functional polyether (PE)-polyisocyanate (P)-hydroxy functional (meth)acrylate (HA).

7. The curable resin composition (X) according to claim 1 wherein the at least one diluent (D) comprises a mixture of monofunctional monomers (M1) or a mixture of at least one monofunctional monomer (M1) and at least one difunctional monomer (M2) or trifunctional monomer (M3).

8. The curable resin composition (X) according to claim 1 wherein the at least one diluent (D) comprises at least one monofunctional monomer (M1) which is selected from the group consisting of methyl methacrylate (MMA), n-butyl methacrylate (BuMA), tert-butyl methacrylate (tBuMA), cyclohexyl methacrylate (CHMA), hydroxyethyl-methacrylate (HEMA), hydroxypropyl methacrylate (HPMA), isobornyl acrylate (IBOA), isobornyl methacrylate (IBoMA), benzyl methacrylate (BMA) and any mixtures thereof.

9. The curable resin composition (X) according to claim 1 wherein the at least one hydroxy functional (meth)acrylate (HA) is selected from the group consisting of: hydroxyethyl acrylate (HEA), hydroxypropyl acrylate (HPA), hydroxyethyl methacrylate (HEMA), hydroxybutyl acrylate (HBA), hydroxybutyl methacrylate (HBMA), cardura acrylate and any mixtures thereof.

10. The curable resin composition (X) according to claim 1 wherein the at least one polyisocyanate (P) is selected from the group consisting of 1,6-diisocyanatohexane (hexamethylene diisocyanate, HDI), 1,1'-methylene bis[4-isocyanatocyclohexane] (H12MDI), 5-isocyanato-1-isocyanatomethyl-1,3,3-trimethyl-cyclohexane (isophorone diisocyanate, IPDI), 1,4-diisocyanatobenzene (BDI), 2,4-diisocyanatotoluene (toluene diisocyanate (TDI)), 1,1'-methylenebis[4-isocyanatobenzene] (MDI), xylilene diisocyanate (XDI), 1,5-naphtalene diisocyanate (NDI), toluidine diisocyanate (TODI), tetramethylxylylene diisocyanate (TMXDI) and p-phenylene diisocyanate (PPDI), trimethyl 1,6 hexamethylene diisocyanate, 4,4'-diisocyanatodicyclohexylmethane, 4,4'-diisocyanatodiphenylmethane, 2,4-diisocyanatodiphenylmethane and any mixtures thereof.

11. The curable resin composition (X) according to claim 1 wherein the at least one hydroxy functional polyether (PE) is selected from the group consisting of polypropylene glycol, polytetramethylene glycol, polybutylene glycol and any mixtures thereof.

12. The curable resin composition (X) according to claim 1 wherein the urethane linkage is from 0.1 mol·kg$^{-1}$ to 1.0 mol·kg$^{-1}$.

13. The curable resin composition (X) according to claim 1 wherein the cold flexible application is selected from the group consisting of waterproofing coating applications, additive manufacturing (3D printing), fiber reinforced composites, adhesives applications, structural adhesives applications, electrical insulating applications, food packaging applications, food packaging adhesives applications, printed circuit boards coatings, conformal coating applications and repair coatings for solar panel.

14. A process for preparing the curable resin composition (X) according to claim 1, comprising the steps of:
   admixing the at least one diluent (D) and the at least one urethane (meth)acrylate (U) and
   adding by dissolution or mixing the at least one radical initiator (I) for activation of the free-radical polymerization.

15. Use of a curable resin composition (X) according to claim 1 for cold flexible applications which is selected in the group consisting of waterproofing coating applications, additive manufacturing (3D printing), fiber reinforced composites, adhesives applications, structural adhesives applications, electrical insulating applications, food packaging applications, food packaging adhesives applications, printed circuit boards coatings, conformal coating applications and repair coatings for solar panel.

16. A coating, an adhesive, a film, a layer or any part prepared from a curable resin composition (X) according to claim 1.

17. A method for coating a substrate with a curable resin composition (X) according to claim 1 which comprises the steps of:
   Step 1: applying the curable resin composition (X) to at least one surface of a substrate and
   Step 2: curing the curable resin composition (X) by submitting the coated substrate to radiation, ambient temperature and/or to heat.

* * * * *